United States Patent
Qi et al.

(10) Patent No.: US 10,383,057 B2
(45) Date of Patent: Aug. 13, 2019

(54) MULTICAST WAKEUP IN WIRELESS NETWORKS

(71) Applicant: Intel IP Corporation, Santa Clara, CA (US)

(72) Inventors: Emily H. Qi, Gig Harbor, WA (US); Po-Kai Huang, Santa Clara, CA (US); Dave Cavalcanti, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 74 days.

(21) Appl. No.: 15/394,428

(22) Filed: Dec. 29, 2016

(65) Prior Publication Data

US 2018/0054782 A1    Feb. 22, 2018

Related U.S. Application Data

(60) Provisional application No. 62/378,003, filed on Aug. 22, 2016.

(51) Int. Cl.
| | |
|---|---|
| *H04W 52/02* | (2009.01) |
| *H04W 4/06* | (2009.01) |
| *H04L 12/18* | (2006.01) |
| *H04W 84/18* | (2009.01) |

(52) U.S. Cl.
CPC ......... *H04W 52/0235* (2013.01); *H04W 4/06* (2013.01); *H04W 52/0248* (2013.01); *H04L 12/189* (2013.01); *H04W 84/18* (2013.01); *Y02D 70/00* (2018.01); *Y02D 70/1224* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/162* (2018.01); *Y02D 70/164* (2018.01); *Y02D 70/166* (2018.01); *Y02D 70/168* (2018.01); *Y02D 70/20* (2018.01); *Y02D 70/21* (2018.01); *Y02D 70/22* (2018.01); *Y02D 70/26* (2018.01)

(58) Field of Classification Search
CPC .. H04L 12/189; H04W 4/06; H04W 52/0235; H04W 52/0248; H04W 84/18
See application file for complete search history.

(56) References Cited

U.S. PATENT DOCUMENTS

| | | | |
|---|---|---|---|
| 8,351,369 B2 * | 1/2013 | Han | H04L 12/66 370/322 |
| 2006/0251119 A1 * | 11/2006 | Ramesh | H04L 45/38 370/468 |
| 2016/0112984 A1 * | 4/2016 | Patil | H04W 68/005 455/458 |
| 2016/0112986 A1 * | 4/2016 | Patil | H04W 48/16 455/515 |
| 2016/0218866 A1 * | 7/2016 | Patil | H04L 9/0833 |

(Continued)

*Primary Examiner* — Awet Haile
(74) *Attorney, Agent, or Firm* — Eversheds Sutherland (US) LLP

(57) ABSTRACT

The disclosure describes systems and methods for updating multicast wakeup schedules in devices in a mesh network such as a neighborhood area network (NAN) multicast service group (NMSG). The systems and methods enable meshed devices to send and receive routing control messages amongst themselves in accordance with a centralized update protocol, a distributed update protocol, or a hybrid update protocol which is a combination of the centralized and distributed update protocols.

18 Claims, 8 Drawing Sheets

(56) References Cited

U.S. PATENT DOCUMENTS

| | | | |
|---|---|---|---|
| 2016/0352842 A1* | 12/2016 | Patil | H04L 67/16 |
| 2017/0201866 A1* | 7/2017 | Liu | H04W 4/06 |
| 2017/0245119 A1* | 8/2017 | Huang | H04L 12/189 |
| 2017/0245296 A1* | 8/2017 | Huang | H04W 74/006 |
| 2017/0311341 A1* | 10/2017 | Patil | H04W 4/06 |
| 2018/0109952 A1* | 4/2018 | Abraham | H04L 63/065 |
| 2018/0139755 A1* | 5/2018 | Patil | H04L 5/0055 |

* cited by examiner

MULTICAST WAKEUP IN WIRELESS NETWORKS

CROSS-REFERENCE TO RELATED APPLICATIONS

This application claims the benefit of U.S. Provisional Application 62/378,003, filed on Aug. 22, 2016, the disclosure of which is incorporated herein by reference as if set forth in full.

TECHNICAL FIELD

This disclosure generally relates to systems and methods for wireless communications and, more particularly, systems and methods for scheduling wireless communications.

BACKGROUND

Neighbor Awareness Networks (NANs) such as Wi-Fi Aware represent a power efficient, scalable, peer-to-peer technology for wireless networking. NAN enables various devices to discover peer devices and/or services in their proximity and setup data paths with the peer devices.

DETAILED DESCRIPTION

Figure 1:
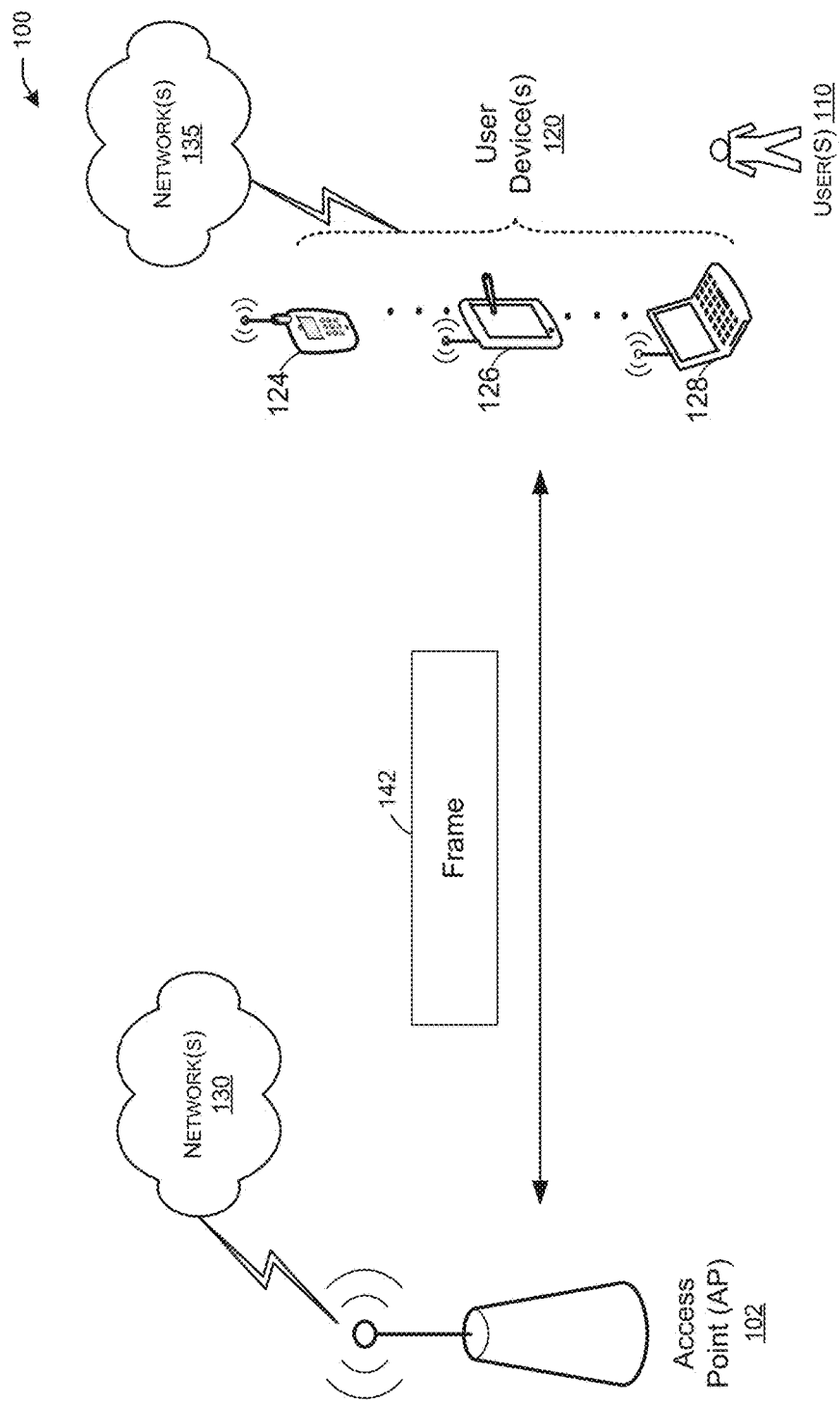
FIG. 1 shows a wireless network environment in accordance with example embodiments of the disclosure.

Example embodiments described herein provide certain systems, methods, and devices, for multicast wakeup scheduling in NANs, such as Wi-Fi Aware.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

In various embodiments of the disclosure, the word "device" can be used interchangeably with the word "node." For example, a node can also be referred to as a device and vice-versa.

Neighbor Awareness Networks (NAN's), such as Wi-Fi Aware, can be used so that devices discover peer devices and/or services in their proximity and setup data paths with one or more peer devices. Mesh devices in a NAN can establish multicast wakeup schedules for use in communicating with one another. The multicast wakeup schedules are governed by a set of schedule parameters such as channels and/or timeslots. Multicast wakeup schedules may need to be updated by a mesh device for a variety of reasons such as power saving, interference avoidance, or frequency requirement for routing topology maintenance. Currently, there is no method defined for updating multicast wakeup schedules in a many-to-many NAN multicast service group (NMSG) in Wi-Fi Aware technical specifications.

In embodiments, the disclosure provides devices and methods for updating multicast wakeup schedules in a mesh network. In embodiments, the disclosure describes devices and methods for updating multicast wakeup schedules in a many device-to-many device NAN multicast service group (NMSG). In embodiments, a plurality of mesh devices can form a NAN multicast service group, and these devices can send mesh control messages to each other and receive mesh control messages from each other that can be used to update multicast wakeup schedules. In embodiments, the disclosure introduces methods for updating multicast wakeup schedules that allow a NAN/mesh node to update its multicast wakeup schedule so that its neighbor nodes are able to receive a routing control message for routing table setup and maintenance. In embodiments, the disclosure can generally be used to update multicast wakeup schedules in a NMSG, and can specifically be used for routing protocol message exchange in a mesh network. In embodiments, methods of the present disclosure are less complex than other existing proposals for updating multicast wakeup schedules in a NSMG.

In embodiments, devices and methods are provided that allow a mesh device in a NAN to update multicast wakeup schedules (e.g. update routing control information) so that the mesh device can receive messages from other devices in the mesh network and/or send messages to other devices in the mesh network. For example, one or more mesh devices in the NMSG can send multicast Destination Oriented Directed Acyclic Graph (DODAG) Information Object (DIO) in routing protocol for low power (RPL) to one or more other mesh devices in the NMSG, or receive the same from one or more other mesh devices in the NMSG. In another example, one or more mesh devices in the NMSG can send a routing control message, such as a routing control message for routing table setup, maintenance, and repairing, to one or more other mesh devices in the NMSG, or receive the same from one or more other mesh devices in the NMSG.

In embodiments, a mesh networked device's multicast wakeup schedule can be updated in accordance with one of three different methods described herein. In embodiments, multicast wakeup schedules can be updated in accordance with a centralized method, a distributed method, or a hybrid method which is a combination of both the centralized and distributed methods.

In a centralized method, only a schedule owner defines and updates a master multicast wakeup schedule for all devices in the NMSG. The schedule owner in a centralized method can be, for example, a root node, a founding device, a central mesh node, or a network coordinator, and the other devices in the NMSG can be relay nodes, leaf nodes, or a combination thereof. In the centralized method, the relay nodes and the leaf nodes all follow the updated master multicast wakeup schedule determined and/or sent (e.g., advertised) by the schedule owner. In the centralized method, for example, the schedule owner can determine and/or send an updated master multicast wakeup schedule to its neighboring nodes (e.g., relay nodes and/or leaf nodes), the neighboring nodes can then send the updated master multicast wakeup schedule to their neighboring nodes, and this process can be repeated until all nodes in the NMSG have received the updated master multicast wakeup schedule.

In a distributed method, a schedule owner defines and updates a local multicast wakeup schedule for use in communicating with neighboring devices in the NMSG. The schedule owner in a distributed method can be, for example, any mesh router in the network (e.g., a root node, a founding device, a network coordinator, or a relay node). In embodiments of a distributed method, any node in the mesh network can be a source of multicast (e.g., a schedule owner), any node can have its own local multicast wakeup schedule for use in communicating with its neighboring nodes, any node can update its own local multicast wakeup schedule, any node can send mesh control messages having control information for its own local multicast wakeup schedule to neighboring nodes, any node can receive a multicast wakeup schedule from a parent node, any node can receive mesh control messages having control information for a parent node's local multicast wakeup schedule, and any node can update its internal multicast wakeup schedule so that the node can receive communications from a parent node according to the parent node's local multicast wakeup schedule.

In embodiments of a distributed method, the schedule owner can determine and/or send an updated local multicast wakeup schedule to its neighboring nodes (e.g., relay nodes and/or leaf nodes), the neighboring nodes can accept the updated local multicast wakeup schedule or negotiate a mutually agreeable local multicast wakeup schedule update with the schedule owner, and the schedule owner and its neighboring nodes can communicate with each other according to the updated local multicast wakeup schedule. Each neighboring node can also act as a schedule owner with respect to its own neighboring nodes, and arrange updated local multicast wakeup schedules with its own neighboring nodes based, in part, on its local multicast wakeup schedules with other devices (e.g. its parent nodes/its own neighbor nodes).

In embodiments, the local multicast wakeup schedule of any node can be stored by its neighboring nodes. In embodiments, a mesh node can store its neighboring nodes' information and corresponding multicast wakeup schedule. In embodiments, multicast wakeup schedule information may be added to a table that represents the neighboring nodes.

In a hybrid method, the multicast wakeup schedule of mesh networked devices can be updated by a combination of both a centralized method and a distributed method operating in tandem or sequentially. For example, in embodiments, the centralized method can be used to update a master multicast wakeup schedule for all devices in the NMSG, which can be used in the event that a mesh network device loses connectivity with a parent or neighbor node, and the distributed method can be used to update local multicast wakeup schedules between neighboring nodes, which can be used for communications between the neighboring nodes.

FIG. 1 illustrates an example wireless network environment according to example embodiments of the present disclosure. Wireless network 100 may include one or more user devices 120 and/or one or more access point(s) (AP) 102, which may communicate in accordance with technical standards that support NAN protocols, such as IEEE 802.11 communication standards, or generally any system that supports NAN protocols. The device(s) 120 may be mobile devices that are non-stationary and do not have fixed locations.

The user device(s) 120 (e.g., 124, 126, or 128) may include any suitable processor-driven user device including, but not limited to, a desktop user device, a laptop user device, a server, a router, a switch, an access point, a smartphone, a tablet, wearable wireless device (e.g., bracelet, watch, glasses, ring, etc.) and so forth. In some embodiments, the user devices 120 and AP 102 may include one or more computer systems similar to that of the functional diagram of FIG. 7 and/or the example machine/system of FIG. 8, to be discussed further.

Any of the user device(s) 120 (e.g., user devices 124, 126, 128), and AP 102 may be configured to communicate with each other (e.g. AP to AP, AP to user device, user device to user device, etc.) and any other component of the wireless network 100 via one or more communications networks 130 and/or 135, wirelessly or wired.

Any of the communications networks 130 and/or 135 may include, but are not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), personal area networks (PANs), neighbor awareness networks (NANs), mesh networks, multi-hop networks, D2D networks, P2P networks, Wi-Fi Aware networks, Wi-Fi networks, BLE networks, and NFC networks. In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128), and AP 102 may include one or more communications antennas. Communications antennas may be any suitable type of antenna corresponding to the communications protocols used by the user device(s) 120 (e.g., user devices 124, 124 and 128), and AP 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, or the like. The communications antenna may be communicatively coupled to a radio component to transmit and/or receive signals, such as communications signals to and/or from the user devices 120.

Any of the user devices 120 (e.g., user devices 124, 126, 128), and AP 102 may include any suitable radio and/or transceiver for transmitting and/or receiving radio frequency (RF) signals in the bandwidth and/or channels corresponding to the communications protocols utilized by any of the user device(s) 120 and AP 102 to communicate with each other (e.g. AP to AP, AP to user device, user device to user device, etc.). The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n), 5 GHz channels (e.g. 802.11n, 802.11ac), or 60 GHZ channels (e.g. 802.11ad). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

Figure 2:
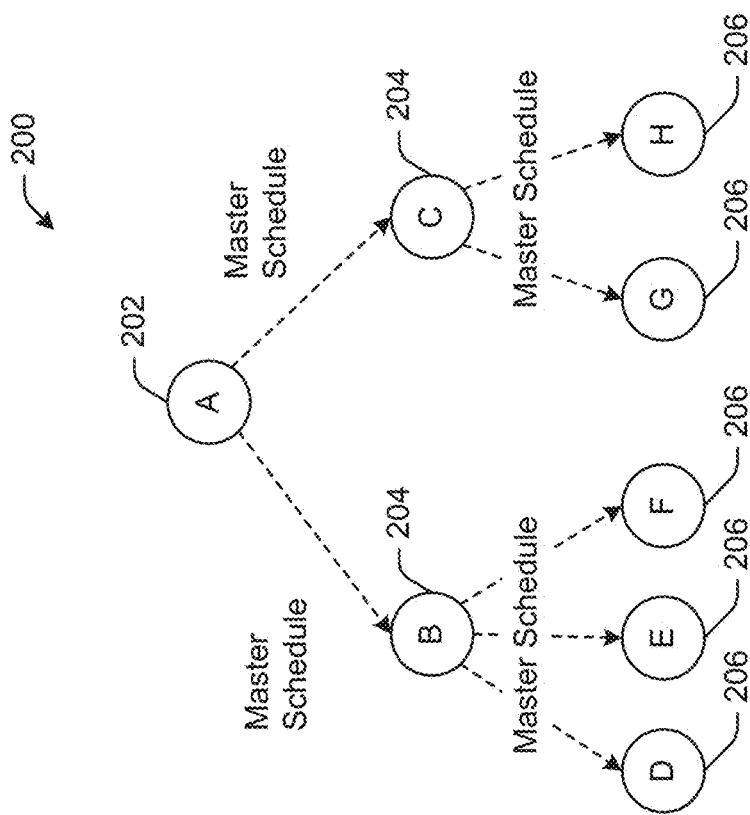
FIG. 2 shows a centralized method of multicast wakeup scheduling in wireless mesh networks in accordance with example embodiments of the disclosure.

FIG. 2 shows a centralized method of master multicast wakeup scheduling in wireless mesh networks in accordance with example embodiments of the disclosure. A wakeup schedule can include, for example, network resource allocations such as channel parameters (e.g. time slots/start time/transmission duration/frequencies/codes) for multicast communications and/or other routing control information such as information relating to routing table setup, maintenance, and repair.

As shown in FIG. 2, a plurality of mesh devices form a NAN multicast service group (NMSG) 200, and these devices can send and/or receive mesh control messages amongst themselves. The plurality of mesh devices can include a schedule owner 202, one or more relay nodes 204, one or more leaf nodes 206, or a combination thereof. Relay nodes 204 can be an enroller of the NMSG.

According to embodiments of the centralized method, schedule owner 202 (e.g. a root node, a founding device, an originator of the NMSG 200, a central mesh node, or a network coordinator) can determine an updated master multicast wakeup schedule for all devices in the wireless mesh network group, including schedule owner 202, any relay nodes 204, and any leaf nodes 206. In embodiments of the centralized method, the schedule owner 202 can define and update a master multicast wakeup schedule for all devices in the NMSG 200, and all devices in the network follow the same updated master multicast wakeup schedule.

As shown in FIG. 2, schedule owner 202 determines an updated master multicast wakeup schedule and sends (e.g., defines or advertises) the updated master multicast wakeup schedule to its neighboring nodes. In the example embodiment of FIG. 2, relay nodes 204 are the neighboring nodes of schedule owner 202. Relay nodes 204 adopt the updated master multicast wakeup schedule they receive from their parent node, which is schedule owner 202 in the example embodiment of FIG. 2. In some embodiments, relay nodes may receive updated master multicast wakeup schedule from other relay nodes. Relay nodes 204 can also send the updated master multicast wakeup schedule to their neighboring nodes. In the example embodiment of FIG. 2, leaf nodes 206 are the neighboring nodes to relay nodes 204. Leaf nodes 206 adopt the updated master multicast wakeup schedule they receive from their parent nodes, which are relay nodes 204 in the example embodiment of FIG. 2. Schedule owner 202, relay nodes 204, and leaf nodes 206 can use the updated master multicast wakeup schedule to communicate with each other. For example, when a relay or leaf node in the NAN mesh network group 200 receives an updated master multicast wakeup schedule, the relay or leaf node can start to use the updated master multicast wakeup schedule for NAN multicast operation (e.g. start NAN multicast operation at the newly scheduled start time).

In embodiments, an updated master multicast wakeup schedule can be included in a NAN Service Discovery frame transmitted in a discovery window. In embodiments, an updated master multicast wakeup schedule can be included in a NAN schedule update frame as a multicast frame.

The NMSG 200 can have any suitable mesh structure. For example, the NMSG 200 can have no relay nodes 204, one layer of relay nodes 204 (as shown in FIG. 2), or multiple layers of relay nodes 204 (e.g. one relay node is a neighboring node to another relay node). The schedule owner 202 can have one or more relay nodes 204, one or more leaf nodes 206, or a combination thereof, as neighboring nodes. Each relay node 204 can have one or more relay nodes 204, one or more leaf nodes 206, or a combination thereof, as neighboring nodes.

A schedule owner 202 may decide to update a master multicast wakeup schedule in response to a network state change or event, particularly where doing so provides an improvement in resource utilization or other benefit to the mesh network/mesh network devices. For example, a schedule owner may determine that a network state change has occurred (e.g. devices enrolling in or leaving the NMSG, network interference, power consumption changes by a device in the network, changes to frequency routing topology in the mesh network, changes in traffic pattern, broken communication links, too many lost/dropped packets, too many requests to join, poor signal quality, changes in network configuration, suboptimal scheduling and resource utilization, etc.) and update a master multicast wakeup schedule to improve resource allocation in the network (e.g. timing/frequency/codes/channels, etc.) or provide another benefit to the mesh network/mesh network devices (improve device power consumption, data transmission reliability in the network, signal strength etc.).

Figure 3:
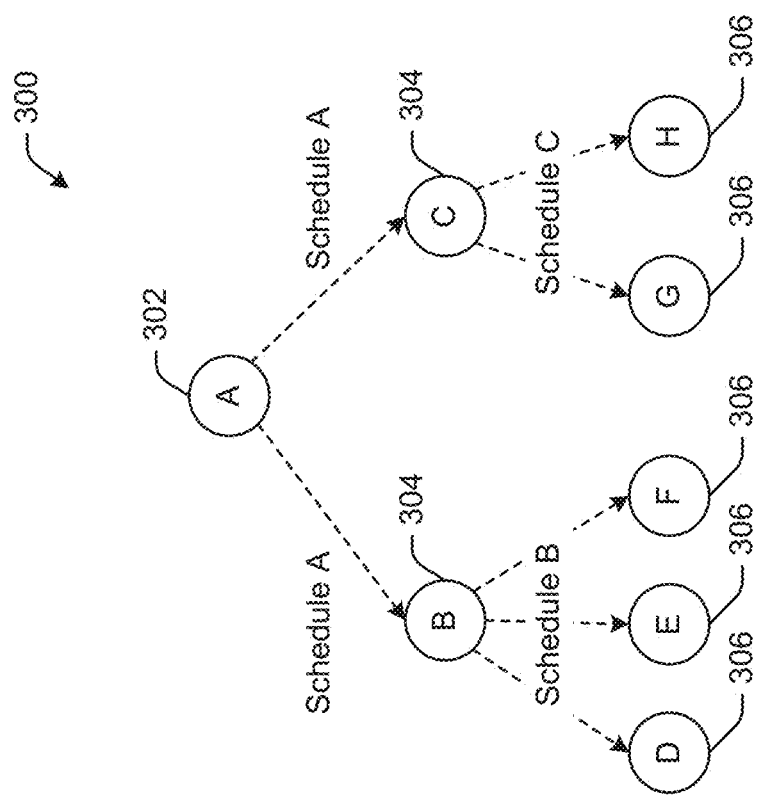
FIG. 3 shows a distributed method of multicast wakeup scheduling in wireless mesh networks in accordance with example embodiments of the disclosure.

For example, with reference to FIG. 2, schedule owner 202 may detect a network state change such as a route change or new nodes joining the network. Schedule owner 202 can determine an updated master multicast wakeup schedule that enables faster and more efficient network formation/updates. Schedule owner 202 can send the updated master multicast wakeup schedule to its neighboring nodes, relay nodes 204. Relay nodes 204 can receive the updated master multicast wakeup schedule and send it to their neighboring nodes, leaf nodes 206. Schedule owner 202, relay nodes 204, and leaf nodes 206 can use the updated master multicast wakeup schedule to communicate with each other. The master multicast wakeup schedule can, for example, control all communications between the various devices (nodes 202, 204, and 206) over the links shown in FIG. 2, FIG. 3 shows a distributed method of local multicast wakeup scheduling in wireless mesh networks in accordance with example embodiments of the disclosure. As shown in FIG. 3, a plurality of mesh devices (e.g. nodes 302, 304, and/or 306) form a NAN multicast service group (NMSG) 300, and these devices can send and receive mesh control messages amongst themselves. The plurality of mesh devices can include, for example, a root node, an originator of the NMSG, a central mesh node, a network coordinator, one or more relay nodes, one or more leaf nodes, or combinations thereof. The NAN multicast service group 300 can have any suitable mesh structure. For example, the NMSG can have one or more different schedule owners (e.g. nodes 302 and 304), each having their own local multicast wakeup schedule with neighboring nodes.

In embodiments of a distributed method, any node in the NMSG 300 (e.g. nodes 302 or 304), other than a leaf node 306, can be a source of multicast (e.g. a schedule owner), any node can have its own local multicast wakeup schedule for use in communicating with neighboring nodes, any node can update its own local multicast wakeup schedule, any node can send (e.g., define or advertise) mesh control messages having control information for its own local multicast wakeup schedule to neighboring nodes, any node can receive multicasts from a parent node, any node can receive mesh control messages having control information for a parent node's local multicast wakeup schedule, and any node can update its internal multicast wakeup schedule so that the node can receive communications from a parent node according to the parent node's local multicast wakeup schedule. In embodiments of the distributed method, any node can have its own local multicast wakeup schedule for communicating with neighboring nodes, and any node can define and update its own local multicast wakeup schedule (e.g. the node acts as a schedule owner).

In embodiments, any node's local multicast wakeup schedule can be stored by its neighbor nodes. In embodiments, any node can store a neighboring node's information and corresponding local multicast wakeup schedule. In embodiments, when a mesh node receives an acceptable, updated local multicast wakeup schedule from a neighboring node in the mesh network, the mesh node can store the local multicast wakeup schedule for that neighbor node and wake up at the updated local schedule to send and receive communications to and from that neighbor node.

A schedule owner may decide to update a local multicast wakeup schedule in response to a network state change or event, particularly where doing so provides an improvement in resource utilization or other benefit to the mesh network/mesh network devices. For example, a schedule owner may determine that a network state change has occurred (e.g. devices enrolling in or leaving the NMSG, network interference, power consumption changes by a device in the network, changes to frequency routing topology in the mesh network, changes in traffic pattern, broken communication links, too many lost/dropped packets, too many requests to join, poor signal quality, changes in network configuration, suboptimal scheduling and resource utilization, etc.) and update a local multicast wakeup schedule to improve resource allocation in the network (e.g. timing/frequency/codes/channels, etc.) or provide another benefit to the mesh network/mesh network devices (improve device power consumption, data transmission reliability in the network, signal strength etc.).

For example, with reference to FIG. 3, node 302 may detect a network state change such as signal interference between it and any of its neighboring nodes (e.g. nodes 304). Node 302 can determine an updated local multicast wakeup schedule, Schedule A, that reduces the signal interference from any of its neighboring nodes (e.g. nodes 304) when node 302 and any of the other neighboring nodes (e.g. nodes 304) communicate. Node 302 can send the updated local multicast wakeup schedule to its neighboring nodes, nodes 304. Nodes 304 can receive the updated local multicast wakeup schedule, and nodes 302 and 304 can communicate with one another in accordance with the updated local multicast wakeup schedule, Schedule A. Nodes 304 may also detect a network state, such as a change in resource utilization based on updated Schedule A (e.g. Schedule A may cause nodes 304 to have a time/frequency conflict with their own respective multicast wakeup schedules, Schedules B and C). Nodes 304 can determine updated local multicast wakeup schedules, Schedules B and C, that eliminate the conflict. Nodes 304 can send the updated local multicast wakeup schedules to their respective neighboring nodes, nodes 306. Nodes 306 can receive the respective updated local multicast wakeup schedules, and nodes 304 and 306 can communicate with one another in accordance with their respective updated local multicast wakeup schedules, Schedules B and C.

In embodiments of a distributed method, any node that acts as a schedule owner (e.g. a source of multicast) can determine and/or send an updated local multicast wakeup schedule to its neighboring nodes (e.g. relay nodes and/or leaf nodes). In embodiments of a distributed method, the neighboring nodes can accept the updated local multicast wakeup schedule or negotiate a mutually agreeable local multicast wakeup schedule update with the schedule owner, and the schedule owner and neighboring nodes can then communicate with each other according to the updated local multicast wakeup schedule. In embodiments of a distributed method, each node can act as a schedule owner with respect to its own neighboring nodes and arrange updated local multicast wakeup schedules with its own neighboring nodes based, in part, on the multicast wakeup schedules of other devices (e.g. parent nodes/other neighboring nodes/root nodes). In embodiments, any node's local multicast wakeup schedule can operate at a channel and/or time pre-determined by another node (e.g. a root node, a parent node) and/or a master multicast wakeup schedule.

In embodiments, an updated local multicast wakeup schedule can be included in a NAN Service Discovery frame transmitted in a discovery window. In embodiments, an updated local multicast wakeup schedule can be included in a NAN schedule update frame as a multicast frame.

In the example of FIG. 3, the mesh network includes nodes 302, 304, and 306. Node 302 is a schedule owner with respect to its neighboring nodes 304, and has a local multicast wakeup schedule defined as Schedule A. Nodes 304, in turn, are schedule owners with respect to their neighboring nodes 306, and have local multicast wakeup schedules defined as Schedule B and Schedule C, respectively. In embodiments of a distributed method, nodes 302 and 304 communicate with one another according to Schedule A, whereas Nodes 302 communicate with their respective neighboring nodes 306 according to Schedule B and Schedule C, respectively. Nodes 302 and 304 can determine and update their local multicast wakeup schedules with their respective neighboring nodes, nodes 304 and 306.

In embodiments, a hybrid method of updating multicast wakeup schedules in wireless mesh networks is provided. The hybrid method can employ a combination of both a centralized method and a distributed method operating in tandem or sequentially.

In embodiments of a hybrid method, a centralized method can be used to update a master multicast wakeup schedule for all devices in the NMSG. In embodiments, only the schedule owner of the master multicast wakeup schedule (e.g. a root node) can determine and update the master multicast wakeup schedule. The master multicast wakeup schedule can be used, for example, by a mesh network device to reestablish connectivity in the event that the mesh network device loses connectivity with its parent and/or neighboring nodes. The mesh network device can use the master multicast wakeup schedule for communicating with other devices in the mesh network, looking for new parent and/or neighboring nodes, and the like.

In embodiments of a hybrid method, once parent/neighboring nodes are established in the mesh network, a node can communicate with parent/neighboring nodes according to a local multicast wakeup schedule. In embodiments, any node in the mesh network can be a source of local multicast with neighboring nodes, and any node can communicate with parent/neighboring nodes according to a local multicast wakeup schedule established between the node and any parent/neighboring nodes. In embodiments, the distributed method can be used to update local multicast wakeup schedules between any node and its parent/neighboring nodes.

In embodiments of a hybrid method, an updated master multicast wakeup schedule and/or an updated local multicast wakeup schedule can be included in a NAN Service Discovery frame transmitted in one or more discovery windows. In embodiments, an updated master multicast wakeup schedule and/or an updated local multicast wakeup schedule can be included in a NAN schedule update frame at an original schedule.

In embodiments, any node's local multicast wakeup schedule can operate at a channel and/or time pre-determined by another node (e.g. a root node, a parent node) and/or a master multicast wakeup schedule. In embodiments, the time slots in the master multicast wakeup schedule may be less frequent than the time slots in the distributed multicast wakeup schedule.

Figure 4:
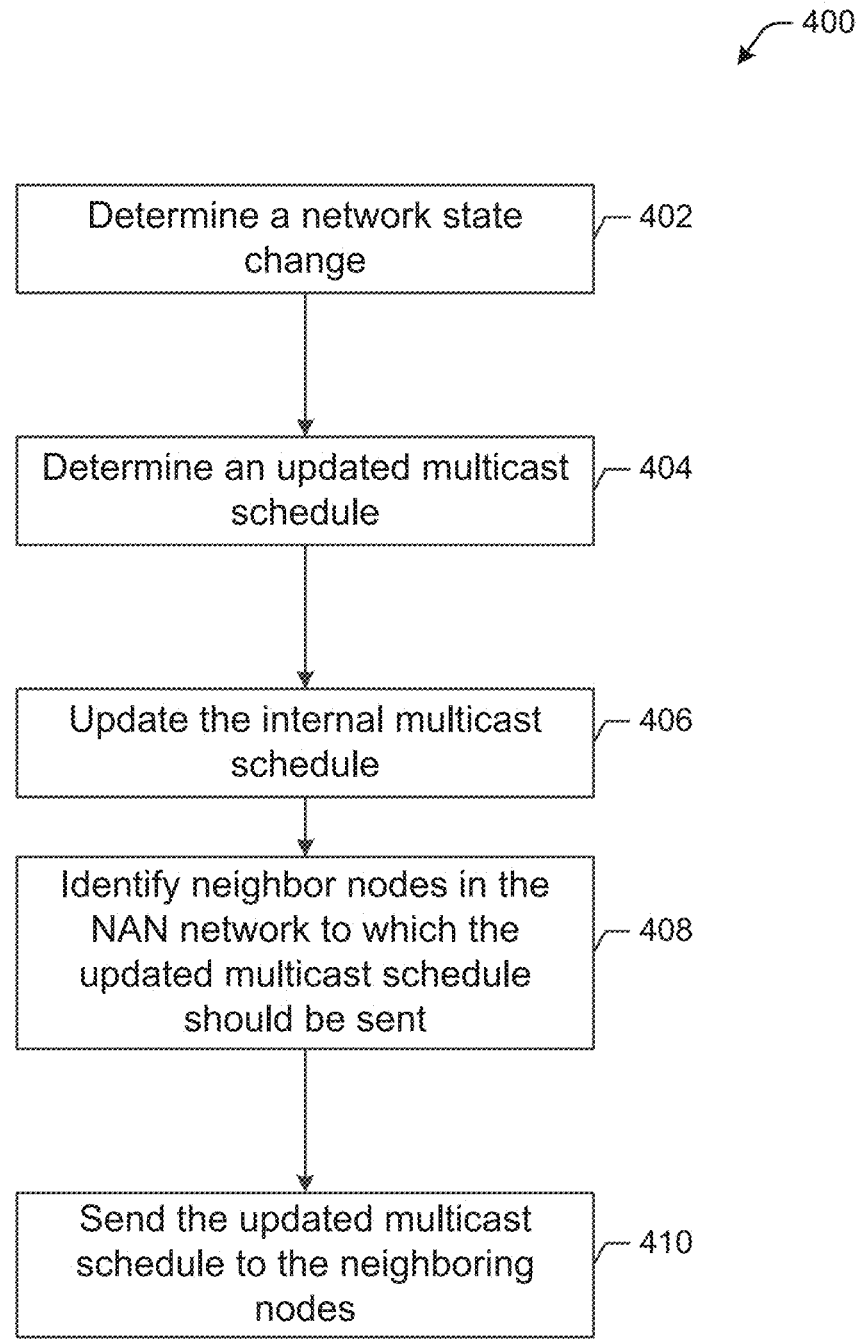
FIG. 4 shows a flow diagram from the perspective of a user device, acting as a schedule owner, in methods of multicast wakeup scheduling in wireless mesh networks in accordance with example embodiments of the disclosure.

FIG. 4 shows a flow diagram of an illustrative process 400 for updating multicast wakeup schedules in wireless mesh networks from the perspective of a user device, acting as a schedule owner, in accordance with example embodiments of the disclosure. The process 400 can apply to a schedule owner in a centralized method, a distributed method, or a hybrid method for updating multicast wakeup schedules. The user device can be any mesh router in the mesh network such as a root node, a founding device, an originator of the NMSG, a central mesh node, a network coordinator, a relay node, and the like.

At block 402, a user device can determine that a network state change has occurred in a NAN multicast service group. A network state change can be any event, detected or determined by any device, that can prompt a schedule owner to update a multicast wakeup schedule in the NMSG. Examples of network state changes can include, for example, devices enrolling in or leaving the NMSG, network interference, power consumption changes by a device in the network, changes to frequency routing topology in the mesh network, and the like. The schedule owner can determine that a network state change has occurred by detecting a network state change itself, being informed of a network state change by another device (e.g. another device in the mesh network), or a combination thereof.

At block 404, a user device can determine an updated multicast wakeup schedule in response to determining that a network state change has occurred. A wakeup schedule can include, for example, network resource allocations such as channel parameters (e.g. time slots/start time/transmission duration/frequencies/codes) for multicast communications and/or other routing control information such as information relating to routing table setup, maintenance, and repair. In embodiments, the schedule owner can determine an updated master multicast wakeup schedule, an updated local multicast wakeup schedule, or both, based at least in part on the network state change. A schedule owner can take into account any properties or parameters of the NAN multicast service group in determining an updated multicast wakeup schedule. For example, in determining an updated multicast wakeup schedule, a schedule owner can take into account existing multicast wakeup schedules (e.g. a master multicast wakeup schedule and local multicast wakeup schedules with parent nodes and/or neighboring nodes). As another example, a schedule owner can take into account devices that have enrolled in or left the NMSG, devices that have become neighboring nodes or devices that are no longer neighboring nodes to the schedule owner, network interference, power consumption changes by a device in the network, changes to frequency routing topology in the mesh network, and the like.

In a centralized method, the schedule owner can determine an updated master multicast wakeup schedule for all devices in the NMSG without negotiating multicast wakeup schedule parameters with any other devices in the NMSG.

In a distributed method, the schedule owner can determine an updated local multicast wakeup schedule for use in communicating with neighboring devices. The schedule owner can determine an updated local multicast wakeup schedule with or without negotiating the updated schedule with neighboring devices. For example, the schedule owner can determine an updated local multicast wakeup schedule and force neighboring devices to follow the updated local multicast wakeup schedule. In another example, the schedule owner can determine an updated local multicast wakeup schedule in concert with optional feedback/input from neighboring devices. In some instances, the schedule owner can determine an updated local multicast wakeup schedule that is agreeable with neighboring devices at first instance, and therefore the updated local multicast wakeup schedule does not require negotiation with the neighboring devices. In other instances, the schedule owner can determine an updated local multicast wakeup schedule by engaging in a back-and-forth negotiation with neighboring devices wherein the schedule owner and neighboring devices negotiate the parameters of the local multicast wakeup schedule so that the local multicast wakeup schedule is mutually agreeable to all devices. The back-and-forth negotiation can include each device sending proposals or counter-proposals for an updated local multicast wakeup schedule.

At block 406, a user device can update its internal multicast wakeup schedule to match that of the updated multicast wakeup schedule determined in block 404. The user device can use the updated multicast wakeup schedule to communicate with one or more devices in the mesh network.

At block 408, the user device can identify neighboring nodes in the NMSG to which the updated multicast wakeup schedule should be sent.

At block 410, the user device can send the updated multicast wakeup schedule to the neighboring nodes identified in block 608.

Figure 5:
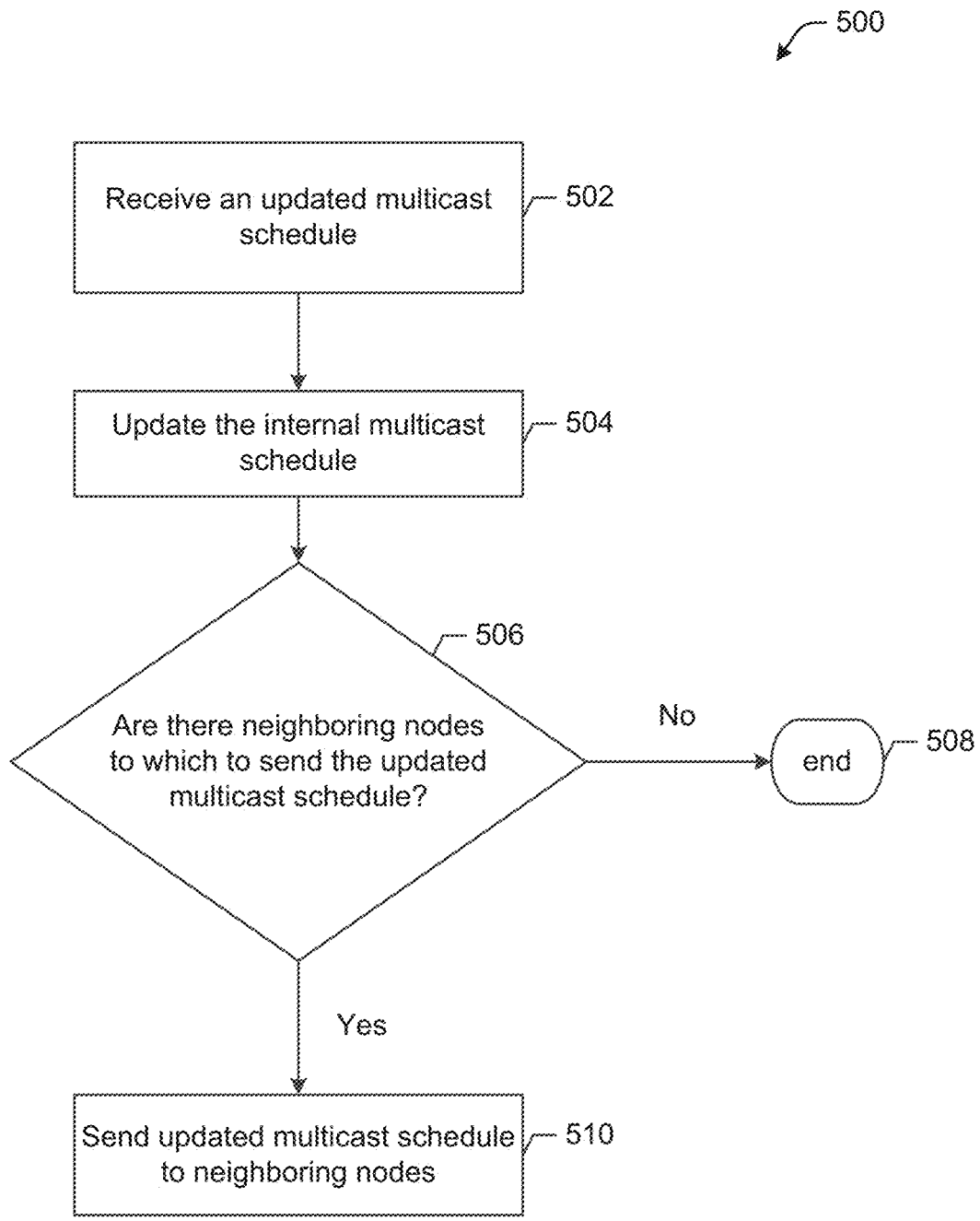
FIG. 5 shows a flow diagram from the perspective of a user device, receiving a master multicast wakeup schedule from a schedule owner, in a centralized method of multicast wakeup scheduling in wireless mesh networks in accordance with example embodiments of the disclosure

FIG. 5 shows a flow diagram of an illustrative process 500 for updating master multicast wakeup schedules in wireless mesh networks from the perspective of a user device, acting as a recipient of an updated master multicast wakeup schedule, in accordance with example embodiments of the disclosure. The process 500 can apply to a user device in a centralized method or a hybrid method for updating multicast wakeup schedules. The user device can be a mesh router such as a network coordinator or a relay node, or the user device can be a leaf node.

At block 502, a user device can receive an updated master multicast wakeup schedule from a parent node (e.g. a schedule owner or a relay device).

At block 504, a user device can update its internal multicast wakeup schedule to match that of the updated master multicast wakeup schedule received in block 502. The user device can use the updated master multicast wakeup schedule to communicate with one or more devices in the mesh network.

At block 506, a user device determines if there are neighboring nodes to which to send the updated master multicast wakeup schedule. If the user device is a leaf node, then the user device can determine that there are no neighboring nodes to which to send the updated master multicast wakeup schedule. If the user device is a relay node, then the user device can determine that there are neighboring nodes to which to send the updated master multicast wakeup schedule.

At block 508, the user device has determined that there are no neighboring nodes to which to send the updated master multicast wakeup schedule, and process 500 ends.

At block 510, the user device has determined that there are neighboring nodes to which to send the updated master multicast wakeup schedule. The user device can send the updated master multicast wakeup schedule to any neighboring nodes. As may be indicated in the master multicast wakeup schedule, the user device may implement the new schedule at the designate time.

Figure 6:
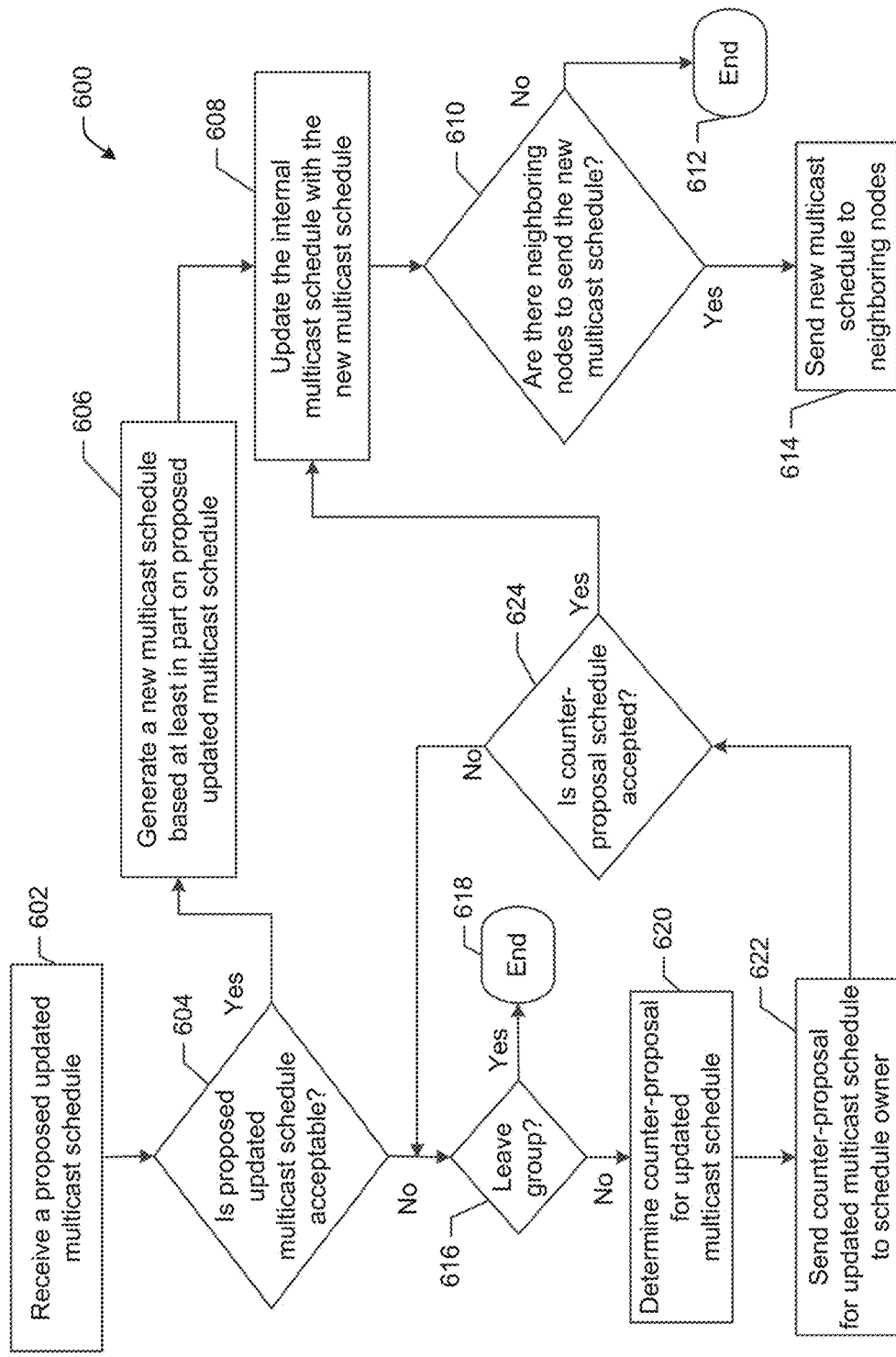
FIG. 6 shows a flow diagram from the perspective of a user device, receiving a proposed local multicast wakeup schedule from a schedule owner, in a distributed method of multicast wakeup scheduling in wireless mesh networks in accordance with example embodiments of the disclosure.

FIG. 6 shows a flow diagram of an illustrative process 600 for updating local multicast wakeup schedules in wireless mesh networks from the perspective of a user device, acting as a recipient of a proposed local multicast wakeup schedule update, in accordance with example embodiments of the disclosure. The process 600 can apply to a user device in a distributed method or a hybrid method for updating local multicast wakeup schedules. The user device can be a mesh router such as a network coordinator or a relay node, or the user device can be a leaf node.

At block 602, a user device can receive a proposed local multicast wakeup schedule update from a parent node (e.g. a schedule owner).

At block 604, a user device can determine if the proposed local multicast wakeup schedule update is acceptable. A user device can determine that a proposed local multicast wakeup schedule update is acceptable or unacceptable for a variety of reasons. A proposed local multicast wakeup schedule update can be acceptable, for example, when the proposed multicast wakeup schedule does not conflict with other multicast wakeup schedules utilized by the user device and/or the proposed multicast wakeup schedule is an efficient use of network resources. A proposed local multicast wakeup schedule update can be unacceptable, for example, when the proposed multicast wakeup schedule conflicts with other multicast wakeup schedules utilized by the user device and/or the proposed multicast wakeup schedule is an inefficient use of network resources.

At block 606, the user device has determined that the proposed local multicast wakeup schedule update from the parent node is acceptable. In embodiments, the user device can determine and/or generate a new local multicast wakeup schedule for itself, based at least in part, on the proposed local multicast wakeup schedule update from the parent node. The user device can determine a new local multicast wakeup schedule taking into account any properties or parameters of the NAN multicast service group. For example, in determining a new local multicast wakeup schedule, the user device can take into account existing multicast wakeup schedules (e.g. a master multicast wakeup schedule or a local multicast wakeup schedule with its parent nodes or neighboring nodes). As another example, a user device can take into account devices that have become neighboring nodes or devices that are no longer neighboring nodes to the user device, network interference, power consumption changes by a device in the network, changes to frequency routing topology in the mesh network, and the like. The new local multicast wakeup schedule can be determined by engaging in a back-and-forth negotiation with neighboring devices wherein the user device and neighboring devices negotiate the parameters of the local multicast wakeup schedule so that the local multicast wakeup schedule is mutually agreeable to all devices.

At block 608, a user device can update its internal multicast wakeup schedule to match that of the new local multicast wakeup schedule determined/generated in block 606. The user device can use the new local multicast wakeup schedule to communicate with one or more devices in the mesh network (e.g. any parent devices and any neighboring devices).

At block 610, a user device determines if there are neighboring nodes to which to send the new local multicast wakeup schedule. If the user device is a leaf node, then the user device can determine that there are no neighboring nodes to which to send the new local multicast wakeup schedule. If the user device is a relay node, then the user device can determine that there are neighboring nodes to which to send the new local multicast wakeup schedule.

At block 612 the user device has determined that there are no neighboring nodes to which to send the new local multicast wakeup schedule, and process 600 ends.

At block 614, the user device has determined that there are neighboring nodes to which to send the new local multicast wakeup schedule. The user device can send the new local multicast wakeup schedule to any neighboring nodes.

At block 616, the user device has determined that the proposed local multicast wakeup schedule update from the parent node is unacceptable. The user device can then engage in a process for conflict resolution. For example, in view of the proposed local multicast wakeup schedule update from the parent node, the user device can determine whether to stay connected with the parent device or disband the connection with the parent device. The user device can determine to stay connected to or disconnect from a parent device for a variety of reasons. For example, a user device may determine to remain connected to a parent device if the user device has not engaged in sufficient back-and-forth negotiation with a parent device, and the user device may determine to disconnect from a parent device if the user device has engaged in sufficient back-and-forth negotiation with a parent device. For example, a user device may be configured to require determining and sending a certain number of local multicast wakeup schedule counter-proposals to the parent device (e.g. 1, 2, 3, 4, 5, 6, or 7 counter-proposals), and only upon sending a certain required number of local multicast wakeup schedule counter-proposals can the user device then decide to discontinue its connection with the parent device. For illustrative purposes, a user device may decide to remain connected to a parent device if it has sent two or fewer local multicast wakeup schedule counter-proposals to a parent device, and a user device may decide to disconnect from a parent device if it has sent three or more local multicast wakeup schedule counter-proposals to a parent device.

At block 618, the user device has determined to disconnect from the parent device, and process 600 ends.

At block 620, the user device has determined to remain connected to the parent device. The user device can engage in a conflict resolution process with the parent device. For example, the user device can determine a local multicast wakeup schedule counter-proposal to govern the local multicast wakeup schedule between the user device and the parent node. The user device can determine a local multicast wakeup schedule counter-proposal taking into account any properties or parameters of the NAN multicast service group. For example, in determining a local multicast wakeup schedule counter-proposal, the user device can take into account existing or proposed multicast wakeup schedules (e.g. a master multicast wakeup schedule, a proposed local multicast wakeup schedule from the parent node, and local multicast wakeup schedules with parent/neighboring nodes). As another example, a user device can take into account devices that have become neighboring nodes or devices that are no longer neighboring nodes to the user device, network interference, power consumption changes by a device in the network, changes to frequency routing topology in the mesh network, and the like.

At block 622, the user device can send the local multicast wakeup schedule counter-proposal to the parent node.

At block 624, the user device can determine if its local multicast wakeup schedule counter-proposal to the parent node was accepted by the parent node. The user device can determine that its local multicast wakeup schedule counter-proposal to the parent node was accepted by the parent node if, for example, the user device receives a message from the parent node indicating acceptance (e.g. receipt of an ack or a proposed local multicast schedule update from the parent node that is the same as the local multicast wakeup schedule counter-proposal). If the user device determines that the parent node accepted the local multicast wakeup schedule counter-proposal, the user device can proceed to block 608.

The user device can determine that its local multicast wakeup schedule counter-proposal to the parent node was rejected by the parent node if, for example, the user device receives a message from the parent node indicating rejection (e.g. receipt of a nack or a proposed local multicast schedule update from the parent node that is different from the local multicast wakeup schedule counter-proposal). If the user device determines that the parent node rejected the local multicast wakeup schedule counter-proposal, the user device can proceed to block 616.

Figure 7:
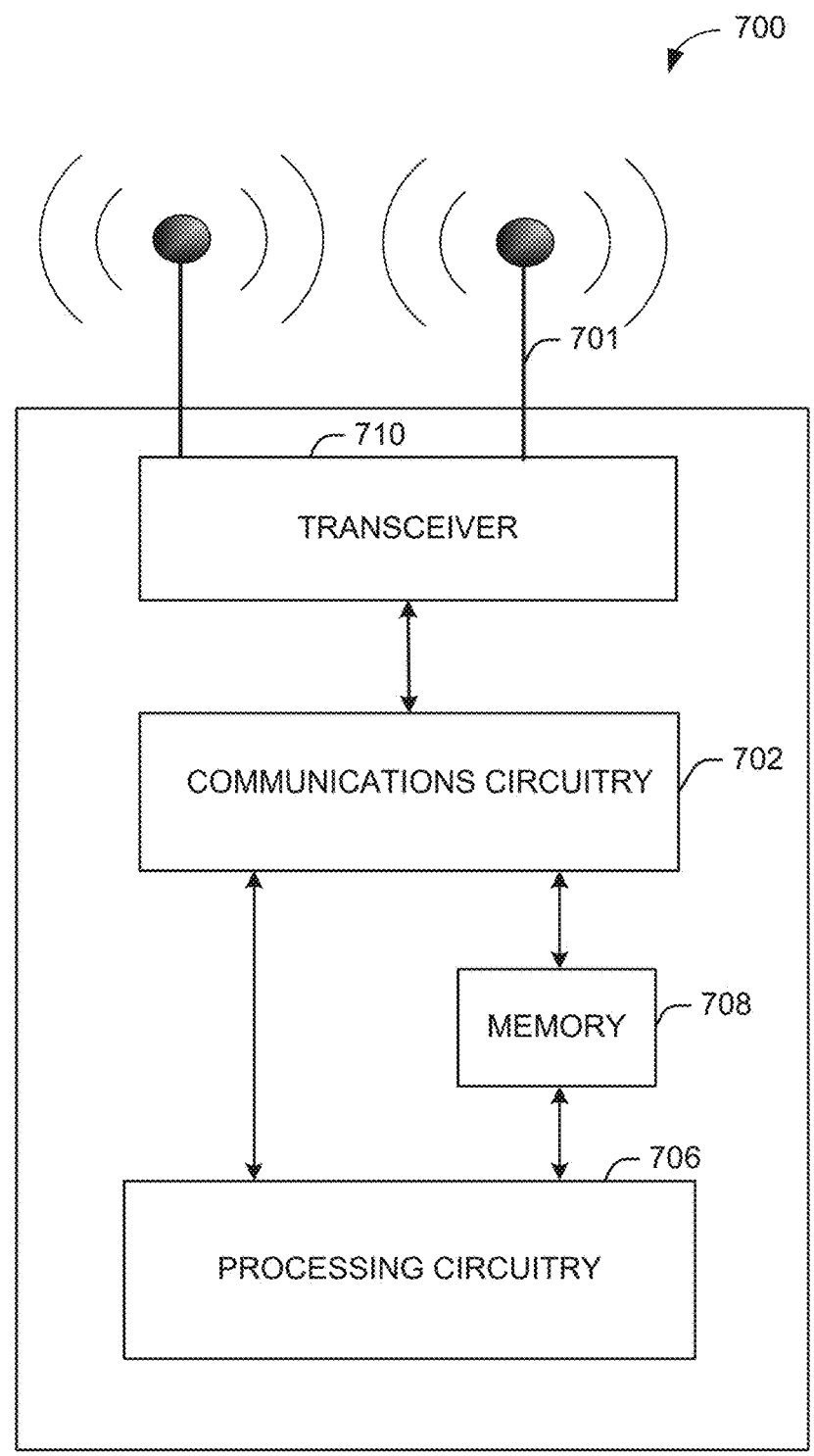
FIG. 7 illustrates a functional diagram of an example communication station suitable for use as a user device in accordance with example embodiments of the disclosure.

FIG. 7 shows a functional diagram of an exemplary communication station 700 in accordance with some embodiments. In one embodiment, FIG. 7 illustrates a functional block diagram of a communication station that may be suitable for use as an AP 102 (FIG. 1) or communication station user device 120 (FIG. 1) in accordance with some embodiments. The communication station 700 may also be suitable for use as a handheld device, mobile device, cellular telephone, smartphone, tablet, netbook, wireless terminal, laptop computer, wearable computer device, femtocell, High Data Rate (HDR) subscriber station, access point, access terminal, or other personal communication system (PCS) device.

The communication station 700 may include communications circuitry 702 and a transceiver 710 for transmitting and receiving signals to and from other communication stations using one or more antennas 701. The communications circuitry 702 may include circuitry that can operate the physical layer communications and/or medium access control (MAC) communications for controlling access to the wireless medium, and/or any other communications layers for transmitting and receiving signals. The communication station 700 may also include processing circuitry 706 and memory 708 arranged to perform the operations described herein. In some embodiments, the communications circuitry 702 and the processing circuitry 706 may be configured to perform operations detailed in FIGS. 1-6.

In accordance with some embodiments, the communications circuitry 702 may be arranged to contend for a wireless medium and configure frames or packets for communicating over the wireless medium. The communications circuitry 702 may be arranged to transmit and receive signals. The communications circuitry 702 may also include circuitry for modulation/demodulation, upconversion/downconversion, filtering, amplification, etc. In some embodiments, the processing circuitry 706 of the communication station 700 may include one or more processors. In other embodiments, two or more antennas 701 may be coupled to the communications circuitry 702 arranged for sending and receiving signals. The memory 708 may store information for configuring the processing circuitry 706 to perform operations for configuring and transmitting message frames and performing the various operations described herein. The memory 708 may include any type of memory, including non-transitory memory, for storing information in a form readable by a machine (e.g., a computer). For example, the memory 708 may include a computer-readable storage device may, read-only memory (ROM), random-access memory (RAM), magnetic disk storage media, optical storage media, flash-memory devices and other storage devices and media.

In some embodiments, the communication station 700 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 700 may include one or more antennas 701. The antennas 701 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 700 may include one or more of a keyboard, a display, a non-volatile memory port, multiple antennas, a graphics processor, an application processor, speakers, and other mobile device elements. The display may be an LCD screen including a touch screen.

Although the communication station 700 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 700 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 700 may include one or more processors and may be configured with instructions stored on a computer-readable storage device memory.

Figure 8:
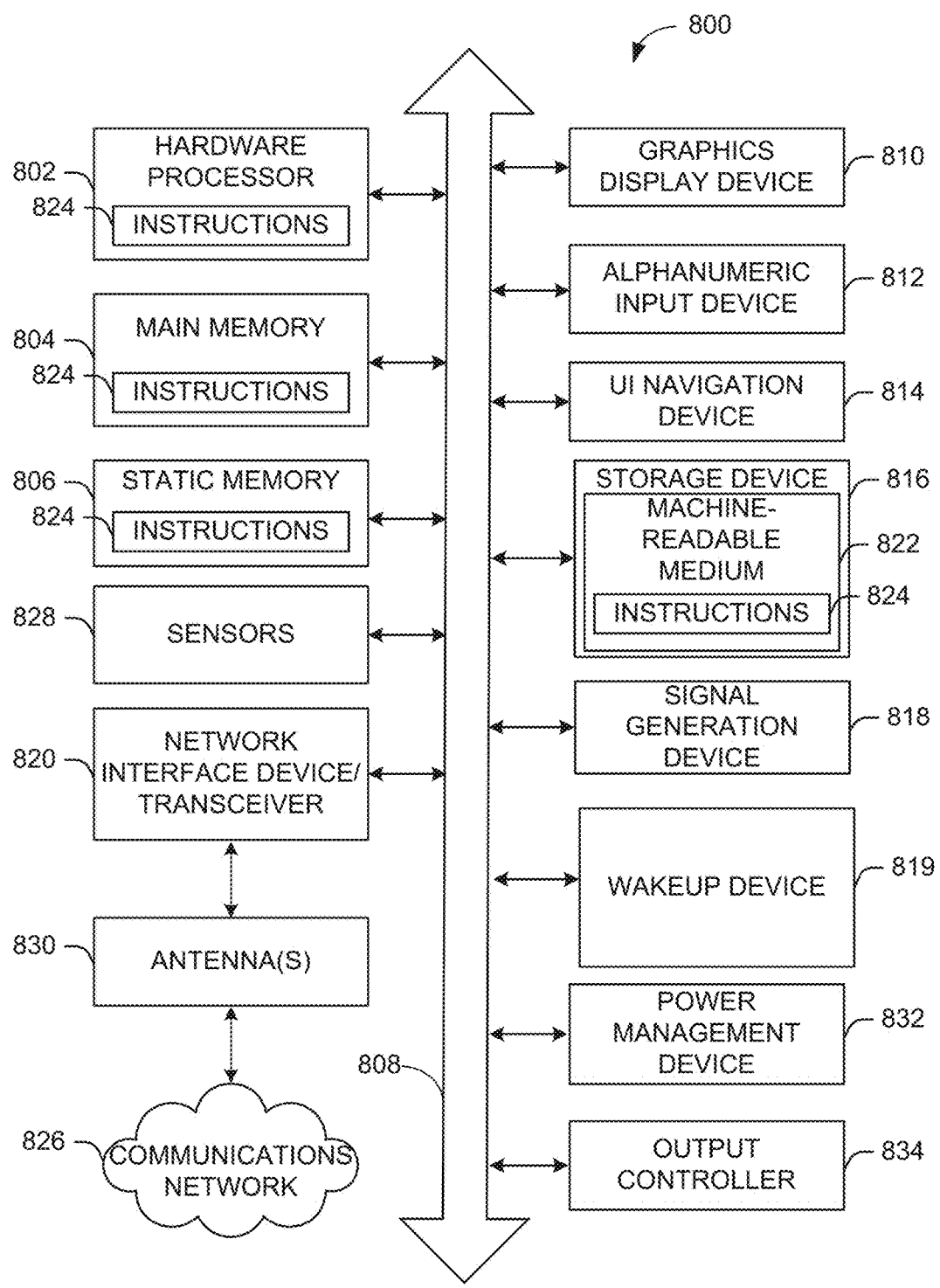
FIG. 8 shows a block diagram of an example machine upon which any of one or more techniques (e.g., methods) may be performed in accordance with embodiments of the disclosure.

FIG. 8 illustrates a block diagram of an example of a machine 800 or system upon which any one or more of the techniques (e.g., methodologies) discussed herein may be performed. In other embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environments. The machine 1000 may be a personal computer (PC), a tablet PC, a set-top box (STB), a personal digital assistant (PDA), a mobile telephone, wearable computer device, a web appliance, a network router, switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 800 may include a hardware processor 802 (e.g., a central processing unit (CPU), a graphics processing unit (GPU), a hardware processor core, or any combination thereof), a main memory 1004 and a static memory 806, some or all of which may communicate with each other via an interlink (e.g., bus) 808. The machine 800 may further include a power management device 832, a graphics display device 810, an alphanumeric input device 812 (e.g., a keyboard), and a user interface (UI) navigation device 814 (e.g., a mouse). In an example, the graphics display device 810, alphanumeric input device 812, and UI navigation device 814 may be a touch screen display. The machine 800 may additionally include a storage device (i.e., drive unit) 816, a signal generation device 818 (e.g., a speaker), a wakeup device 819, a network interface device/transceiver 820 coupled to antenna(s) 830, and one or more sensors 828, such as a global positioning system (GPS) sensor, compass, accelerometer, or other sensor. The machine 800 may include an output controller 834, such as a serial (e.g., universal serial bus (USB), parallel, or other wired or wireless (e.g., infrared (IR), near field communication (NFC), etc.) connection to communicate with or control one or more peripheral devices (e.g., a printer, card reader, etc.)).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within the static memory 806, or within the hardware processor 802 during execution thereof by the machine 800. In an example, one or any combination of the hardware processor 802, the main memory 804, the static memory 806, or the storage device 816 may constitute machine-readable media.

The wakeup device 819 may be configured to update multicast wakeup schedules in a mesh network such as a NAN. The wakeup device 819 may be further configured to determine that a network state change has occurred in a mesh network; determine, based at least in part on the network change, a first multicast wakeup schedule for use in communicating in the mesh network; determine one or more neighboring devices in the mesh network to send the first multicast wakeup schedule; and cause to send the first multicast wakeup schedule to the one or more neighboring devices. The wakeup device 819 may be further configured to identify a first multicast wakeup schedule received from a parent device in a mesh network; determine a second multicast wakeup schedule that is different from the first multicast wakeup schedule; determine one or more neighboring devices in the mesh network; and cause to send the second multicast wakeup schedule to the one or more neighboring devices. The wakeup device 819 may be further configured to identify a multicast wakeup schedule received from a parent device in a mesh network; update an internal multicast wakeup schedule of the wireless device using the multicast wakeup schedule; determine one or more neighboring devices in the mesh network; and cause to send the multicast wakeup schedule to the one or more neighboring devices.

It is understood that the above are only a subset of what the wakeup device 819 may be configured to perform and that other functions included throughout this disclosure may also be performed by the wakeup device 819.

While the machine-readable medium 822 is illustrated as a single medium, the term "machine-readable medium" may include a single medium or multiple media (e.g., a centralized or distributed database, and/or associated caches and servers) configured to store the one or more instructions 824.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 800 and that cause the machine 800 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., Electrically Programmable Read-Only Memory (EPROM), or Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device/transceiver 820 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), Plain Old Telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 820 may include one or more physical jacks (e.g., Ethernet, coaxial, or phone jacks) or one or more antennas to connect to the communications network 826. In an example, the network interface device/transceiver 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 800 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device", "user device", "communication station", "station", "handheld device", "mobile device", "wireless device" and "user equipment" (UE) as used herein refers to a wireless communication device such as a cellular telephone, smartphone, tablet, netbook, wireless terminal, laptop computer, a femtocell, High Data Rate (HDR) subscriber station, access point, printer, point of sale device, access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as 'communicating', when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

The term "access point" (AP) as used herein may be a fixed station. An access point may also be referred to as an access node, a base station, or some other similar terminology known in the art. An access terminal may also be called a mobile station, user equipment (UE), a wireless communication device, or some other similar terminology known in the art. Embodiments disclosed herein generally pertain to wireless networks. Some embodiments can relate to wireless networks that operate in accordance with one of the IEEE 802.11 standards.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems following one or more wireless communication protocols, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems, and/or networks.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Example 1 is a wireless device comprising memory and processing circuitry configured to: determine that a network state change has occurred in a mesh network; determine, based at least in part on the network change, a first multicast wakeup schedule for use in communicating in the mesh network; determine one or more neighboring devices in the mesh network to send the first multicast wakeup schedule; and cause to send the first multicast wakeup schedule to the one or more neighboring devices. In example 2, the device of example 1 can optionally include the first multicast wakeup schedule being a master multicast wakeup schedule. In example 3, the device of any one of examples 1-2 can optionally include the first multicast wakeup schedule being a local multicast wakeup schedule. In example 4, the device of any one of examples 1-3 can optionally include the first multicast wakeup schedule being sent to the one or more neighboring devices in a neighbor awareness network multicast service group (NMSG) message. In example 5, the device of any one of examples 1-4 can optionally include the first multicast wakeup schedule being sent to the one or more neighboring devices in a neighbor awareness network service discovery frame that is sent in a discovery window. In example 6, the device of any one of examples 1-5 can optionally include the first multicast wakeup schedule being sent to the one or more neighboring devices in a neighbor awareness network schedule update frame. In example 7, the device of any one of examples 1-6 can optionally include the mesh network being a neighborhood area network. In example 8, the device of any one of examples 1-7 can optionally include the network state change comprising a user device enrolling in the mesh network, a user device leaving the mesh network, network inference in the mesh network, a power consumption change by a user device in the mesh network, or a change in frequency routing topology in the mesh network. In example 9, the device of any one of examples 1-8 can optionally include the first multicast wakeup schedule including a resource allocation for multicast operation. In example 10, the device of any one of examples 1-9 can optionally include the resource allocation including a start time. In example 11, the device of any one of examples 1-10 can optionally include the memory and processing circuitry being further configured to: identify a second multicast wakeup schedule received from a first neighboring device of the one or more neighboring devices; determine a third multicast wakeup schedule, based at least in part on the second multicast wakeup schedule, for use in communicating in the mesh network; and cause to send the third multicast wakeup schedule to the one or more neighboring devices.

Example 12 is a wireless device comprising memory and processing circuitry configured to: identify a multicast wakeup schedule received from a parent device in a mesh network; update an internal multicast schedule of the wireless device using the multicast wakeup schedule; determine one or more neighboring devices in the mesh network; and cause to send the multicast wakeup schedule to the one or more neighboring devices. In example 13, the device of example 12 can optionally include the multicast wakeup schedule being a master multicast wakeup schedule. In example 14, the device of any one of examples 12-13 can optionally include the multicast wakeup schedule including a resource allocation for multicast operation. In example 15, the device of any one of examples 12-14 can optionally include the resource allocation including a start time.

Example 16 is a wireless device comprising memory and processing circuitry configured to: identify a first multicast wakeup schedule received from a parent device in a mesh network; determine a second multicast wakeup schedule that is different from the first multicast wakeup schedule; determine one or more neighboring devices in the mesh network; and cause to send the second multicast wakeup schedule to the one or more neighboring devices. In example 17, the device of example 16 can optionally include the first multicast wakeup schedule and the second multicast wakeup schedule allowing complimentary use of network resources at the wireless device. In example 18, the device of any one of examples 16-17 can optionally include the second multicast wakeup schedule being based at least in part on the first wakeup schedule. In example 19, the device of any one of examples 16-18 can optionally include the memory and processing circuitry are further configured to: determine to send to the parent device a third multicast wakeup schedule that is different from the first multicast wakeup schedule; determine the third multicast wakeup schedule based at least in part on the first multicast wakeup schedule; cause to send the third multicast wakeup schedule to the parent device; and identify a fourth multicast wakeup schedule received from the parent device, wherein the second multicast wakeup schedule is based at least in part on the fourth multicast wakeup schedule. In example 20, the device of any one of examples 16-19 can optionally include the first multicast schedule comprising a master multicast wakeup schedule and a local multicast wakeup schedule, and the second multicast wakeup schedule comprising the master multicast wakeup schedule.

Example 21 is a non-transitory computer-readable medium storing computer-executable instructions which, when executed by a processor, cause the processor to perform operations comprising: identifying a multicast wakeup schedule received from a parent device in a mesh network; updating an internal multicast schedule of a wireless device using the multicast wakeup schedule; determining one or more neighboring devices in the mesh network; and causing to send the multicast wakeup schedule to the one or more neighboring devices. In example 22, the computer-readable medium of example 21 can optionally include the multicast wakeup schedule being a master multicast wakeup schedule.

Example 23 is a non-transitory computer-readable medium storing computer-executable instructions which, when executed by a processor, cause the processor to perform operations comprising: determining that a network state change has occurred in a mesh network; determining, based at least in part on the network change, a first multicast wakeup schedule for use in communicating in the mesh network; determining one or more neighboring devices in the mesh network to send the first multicast wakeup schedule; and causing to send the first multicast wakeup schedule to the one or more neighboring devices. In example 24, the computer-readable medium of example 23 can optionally include the first multicast wakeup schedule being a master multicast wakeup schedule. In example 25, the computer-readable medium of any one of examples 23-24 can optionally include the first multicast wakeup schedule being a local multicast wakeup schedule. In example 26, the computer-readable medium of any one of examples 23-25 can optionally include the first multicast wakeup schedule being sent to the one or more neighboring devices in a neighbor awareness network multicast service group (NMSG) message. In example 27, the computer-readable medium of any one of examples 23-26 can optionally include the first multicast wakeup schedule being sent to the one or more neighboring devices in a neighbor awareness network service discovery frame that is sent in a discovery window. In example 28, the computer-readable medium of any one of examples 23-27 can optionally include the first multicast wakeup schedule being sent to the one or more neighboring devices in a neighbor awareness network schedule update frame. In example 29, the computer-readable medium of any one of examples 23-28 can optionally include the mesh network being a neighborhood area network. In example 30, the computer-readable medium of any one of examples 23-29 can optionally include the network state change comprising a user device enrolling in the mesh network, a user device leaving the mesh network, network inference in the mesh network, a power consumption change by a user device in the mesh network, or a change in frequency routing topology in the mesh network. In example 31, the computer-readable medium of any one of examples 23-30 can optionally include the first multicast wakeup schedule includes a resource allocation for multicast operation. In example 32, the computer-readable medium of any one of examples 23-31 can optionally include the resource allocation including a start time. In example 33, the computer-readable medium of any one of examples 23-32 can optionally include the operations further comprising: identifying a second multicast wakeup schedule received from a first neighboring device of the one or more neighboring devices; determining a third multicast wakeup schedule, based at least in part on the second multicast wakeup schedule, for use in communicating in the mesh network; and causing to send the third multicast wakeup schedule to the one or more neighboring devices.

Example 34 is a method comprising: determining that a network state change has occurred in a mesh network; determining, based at least in part on the network change, a first multicast wakeup schedule for use in communicating in the mesh network; determining one or more neighboring devices in the mesh network to send the first multicast wakeup schedule; and causing to send the first multicast wakeup schedule to the one or more neighboring devices. In example 35, the method of example 34 can optionally include the first multicast wakeup schedule being a master multicast wakeup schedule. In example 36, the method of any one of examples 34-35 can optionally include the first multicast wakeup schedule being a local multicast wakeup schedule. In example 37, the method of any one of examples 34-36 can optionally include the first multicast wakeup schedule being sent to the one or more neighboring devices in a neighbor awareness network multicast service group (NMSG) message. In example 38, the method of any one of examples 34-37 can optionally include the first multicast wakeup schedule is sent to the one or more neighboring devices in a neighbor awareness network service discovery frame that is sent in a discovery window. In example 39, the method of any one of examples 34-38 can optionally include the first multicast wakeup schedule being sent to the one or more neighboring devices in a neighbor awareness network schedule update frame. In example 40, the method of any one of examples 34-39 can optionally include the mesh network is a neighborhood area network. In example 41, the method of any one of examples 34-40 can optionally include the network state change comprising a user device enrolling in the mesh network, a user device leaving the mesh network, network inference in the mesh network, a power consumption change by a user device in the mesh network, or a change in frequency routing topology in the mesh network. In example 42, the method of any one of examples 34-41 can optionally include the first multicast wakeup schedule including a resource allocation for multicast operation. In example 43, the method of any one of examples 34-42 can optionally include the resource allocation including a start time. In example 44, the method of any one of examples 34-44 can optionally include the method further comprising: identifying a second multicast wakeup schedule received from a first neighboring device of the one or more neighboring devices; determining a third multicast wakeup schedule, based at least in part on the second multicast wakeup schedule, for use in communicating in the mesh network; and causing to send the third multicast wakeup schedule to the one or more neighboring devices.

Example 48 is an apparatus comprising: means for determining that a network state change has occurred in a mesh network; means for determining, based at least in part on the network change, a first multicast wakeup schedule for use in communicating in the mesh network; means for determining one or more neighboring devices in the mesh network to send the first multicast wakeup schedule; and means for causing to send the first multicast wakeup schedule to the one or more neighboring devices. In example 49, the apparatus of example 48 can optionally include the first multicast wakeup schedule being a master multicast wakeup schedule. In example 50, the apparatus of any one of examples 48-49 can optionally include the first multicast wakeup schedule being a local multicast wakeup schedule. In example 51, the apparatus of any one of examples 48-50 can optionally include the first multicast wakeup schedule being sent to the one or more neighboring devices in a neighbor awareness network multicast service group (NMSG) message. In example 52, the apparatus of any one of examples 48-51 can optionally include the first multicast wakeup schedule being sent to the one or more neighboring devices in a neighbor awareness network service discovery frame that is sent in a discovery window. In example 53, the apparatus of any one of examples 48-52 can optionally include the first multicast wakeup schedule being sent to the one or more neighboring devices in a neighbor awareness network schedule update frame. In example 54, the apparatus of any one of examples 48-53 can optionally include the mesh network being a neighborhood area network. In example 55, the apparatus of any one of examples 48-54 can optionally include the network state change comprising a user device enrolling in the mesh network, a user device leaving the mesh network, network inference in the mesh network, a power consumption change by a user device in the mesh network, or a change in frequency routing topology in the mesh network. In example 56, the apparatus of any one of examples 48-55 can optionally include the first multicast wakeup schedule including a resource allocation for multicast operation. In example 57, the apparatus of any one of examples 48-56 can optionally include the resource allocation including a start time. In example 58, the apparatus of any one of examples 48-57 can optionally include means for identifying a second multicast wakeup schedule received from a first neighboring device of the one or more neighboring devices; means for determining a third multicast wakeup schedule, based at least in part on the second multicast wakeup schedule, for use in communicating in the mesh network; and means for causing to send the third multicast wakeup schedule to the one or more neighboring devices.

Example 59 is a method comprising: identifying a multicast wakeup schedule received from a parent device in a mesh network; updating an internal multicast schedule of a wireless device using the multicast wakeup schedule; determining one or more neighboring devices in the mesh network; and causing to send the multicast wakeup schedule to the one or more neighboring devices. In example 60, the method of example 59 can optionally include the multicast wakeup schedule being a master multicast wakeup schedule.

Example 64 is an apparatus comprising: means for identifying a multicast wakeup schedule received from a parent device in a mesh network; means for updating an internal multicast schedule of a wireless device using the multicast wakeup schedule; means for determining one or more neighboring devices in the mesh network; and means for causing to send the multicast wakeup schedule to the one or more neighboring devices. In example 65, the apparatus of example 64 can optionally include the multicast wakeup schedule being a master multicast wakeup schedule.

Example 66 is a non-transitory computer-readable medium storing computer-executable instructions which, when executed by a processor, cause the processor to perform operations comprising: identifying a first multicast wakeup schedule received from a parent device in a mesh network; determining a second multicast wakeup schedule that is different from the first multicast wakeup schedule; determining one or more neighboring devices in the mesh network; and causing to send the second multicast wakeup schedule to the one or more neighboring devices. In example 67, the computer-readable medium of example 66 can optionally include the first multicast wakeup schedule and the second multicast wakeup schedule allowing complimentary use of network resources at the wireless device. In example 68, the computer-readable medium of any one of examples 66-67 can optionally include the second multicast wakeup schedule being based at least in part on the first wakeup schedule. In example 69, the computer-readable medium of any one of examples 66-68 can optionally include operations further comprising: determining to send to the parent device a third multicast wakeup schedule that is different from the first multicast wakeup schedule; determining the third multicast wakeup schedule based at least in part on the first multicast wakeup schedule; causing to send the third multicast wakeup schedule to the parent device; and identifying a fourth multicast wakeup schedule received from the parent device, wherein the second multicast wakeup schedule is based at least in part on the fourth multicast wakeup schedule. In example 70, the computer-readable medium of any one of examples 66-69 can optionally include the first multicast schedule comprising a master multicast wakeup schedule and a local multicast wakeup schedule, and the second multicast wakeup schedule comprises the master multicast wakeup schedule.

Example 71 is a method comprising: identifying a first multicast wakeup schedule received from a parent device in a mesh network; determining a second multicast wakeup schedule that is different from the first multicast wakeup schedule; determining one or more neighboring devices in the mesh network; and causing to send the second multicast wakeup schedule to the one or more neighboring devices. In example 72, the method of example 71 can optionally include the first multicast wakeup schedule and the second multicast wakeup schedule allowing complimentary use of network resources at the wireless device. In example 73, the method of any one of examples 71-72 can optionally include the second multicast wakeup schedule being based at least in part on the first wakeup schedule. In example 74, the method of any one of examples 71-73 can optionally include determining to send to the parent device a third multicast wakeup schedule that is different from the first multicast wakeup schedule; determining the third multicast wakeup schedule based at least in part on the first multicast wakeup schedule; causing to send the third multicast wakeup schedule to the parent device; and identifying a fourth multicast wakeup schedule received from the parent device, wherein the second multicast wakeup schedule is based at least in part on the fourth multicast wakeup schedule. In example 75, the method of any one of examples 71-74 can optionally include the first multicast schedule comprising a master multicast wakeup schedule and a local multicast wakeup schedule, and the second multicast wakeup schedule comprising the master multicast wakeup schedule.

Example 79 is an apparatus comprising: means for identifying a first multicast wakeup schedule received from a parent device in a mesh network; means for determining a second multicast wakeup schedule that is different from the first multicast wakeup schedule; means for determining one or more neighboring devices in the mesh network; and means for causing to send the second multicast wakeup schedule to the one or more neighboring devices. In example 80, the apparatus of example 79 can optionally include the first multicast wakeup schedule and the second multicast wakeup schedule allowing complimentary use of network resources at the wireless device. In example 81, the apparatus of any one of examples 79-80 can optionally include the second multicast wakeup schedule being based at least in part on the first wakeup schedule. In example 82, the apparatus of any one of examples 79-81 can optionally include means for determining to send to the parent device a third multicast wakeup schedule that is different from the first multicast wakeup schedule; means for determining the third multicast wakeup schedule based at least in part on the first multicast wakeup schedule; means for causing to send the third multicast wakeup schedule to the parent device; and means for identifying a fourth multicast wakeup schedule received from the parent device, wherein the second multicast wakeup schedule is based at least in part on the fourth multicast wakeup schedule. In example 83, the apparatus of any one of examples 79-82 can optionally include the first multicast schedule comprising a master multicast wakeup schedule and a local multicast wakeup schedule, and the second multicast wakeup schedule comprising the master multicast wakeup schedule.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A wireless device comprising memory and processing circuitry configured to:
   determine that a network state change has occurred in a mesh network;
   determine, based at least in part on the network state change, a first multicast wakeup schedule for use in communicating in the mesh network;
   determine one or more neighboring devices in the mesh network to send the first multicast wakeup schedule; and
   cause to send the first multicast wakeup schedule to the one or more neighboring devices, wherein the first multicast wakeup schedule is sent to the one or more neighboring devices in a neighbor awareness network service discovery frame that is sent in a discovery window.

2. The wireless device of claim 1, wherein the first multicast wakeup schedule is a master multicast wakeup schedule.

3. The wireless device of claim 1, wherein the first multicast wakeup schedule is a local multicast wakeup schedule.

4. The wireless device of claim 1, wherein the memory and processing circuitry are further configured to:
   determine a second multicast wakeup schedule for use in communicating in the mesh network; and
   cause to send the second multicast wakeup schedule to the one or more neighboring devices, wherein the second multicast wakeup schedule is sent to the one or more neighboring devices in a neighbor awareness network schedule update frame.

5. The wireless device of claim 1, wherein the mesh network is a neighborhood area network.

6. The wireless device of claim 1, wherein the network state change comprises a user device enrolling in the mesh network, a user device leaving the mesh network, network inference in the mesh network, a power consumption change by a user device in the mesh network, or a change in frequency routing topology in the mesh network.

7. The wireless device of claim 1, wherein the first multicast wakeup schedule includes a resource allocation for multicast operation.

8. The wireless device of claim 7, wherein the resource allocation includes a start time.

9. The wireless device of claim 1, wherein the memory and processing circuitry are further configured to:
identify a second multicast wakeup schedule received from a first neighboring device of the one or more neighboring devices;
determine a third multicast wakeup schedule, based at least in part on the second multicast wakeup schedule, for use in communicating in the mesh network; and
cause to send the third multicast wakeup schedule to the one or more neighboring devices.

10. A wireless device comprising memory and processing circuitry configured to:
identify a multicast wakeup schedule received from a parent device in a mesh network;
update an internal multicast schedule of the wireless device using the multicast wakeup schedule;
determine one or more neighboring devices in the mesh network; and
cause to send the multicast wakeup schedule to the one or more neighboring devices, wherein the multicast wakeup schedule is sent to the one or more neighboring devices in a neighbor awareness network service discovery frame that is sent in a discovery window.

11. The wireless device of claim 10, wherein the multicast wakeup schedule is a master multicast wakeup schedule.

12. The wireless device of claim 10, wherein the multicast wakeup schedule includes a resource allocation for multicast operation.

13. The wireless device of claim 12, wherein the resource allocation includes a start time.

14. A wireless device comprising memory and processing circuitry configured to:
identify a first multicast wakeup schedule received from a parent device in a mesh network;
determine a second multicast wakeup schedule that is different from the first multicast wakeup schedule;
determine one or more neighboring devices in the mesh network; and
cause to send the second multicast wakeup schedule to the one or more neighboring devices, wherein the second multicast wakeup schedule is sent to the one or more neighboring devices in a neighbor awareness network service discovery frame that is sent in a discovery window.

15. The wireless device of claim 14, wherein the first multicast wakeup schedule and the second multicast wakeup schedule allow complimentary use of network resources at the wireless device.

16. The wireless device of claim 14, wherein the second multicast wakeup schedule is based at least in part on the first multicast wakeup schedule.

17. The wireless device of claim 14, wherein the memory and processing circuitry are further configured to:
determine to send to the parent device a third multicast wakeup schedule that is different from the first multicast wakeup schedule;
determine the third multicast wakeup schedule based at least in part on the first multicast wakeup schedule;
cause to send the third multicast wakeup schedule to the parent device; and
identify a fourth multicast wakeup schedule received from the parent device, wherein the second multicast wakeup schedule is based at least in part on the fourth multicast wakeup schedule.

18. The wireless device of claim 14, wherein the first multicast wakeup schedule comprises a master multicast wakeup schedule and a local multicast wakeup schedule, and wherein the second multicast wakeup schedule comprises the master multicast wakeup schedule.

* * * * *